United States Patent [19]

Kamimoto

[11] 4,185,183
[45] Jan. 22, 1980

[54] INDUCTION HEATING APPARATUS WITH ADJUSTABLE FLUX CONCENTRATORS

[75] Inventor: Yoshiyuki Kamimoto, Kitakasuragi, Japan

[73] Assignee: Toyo Aluminum K.K., Osaka, Japan

[21] Appl. No.: 809,287

[22] Filed: Jun. 23, 1977

[30] Foreign Application Priority Data

Jun. 26, 1976 [JP] Japan .................................. 51-75748

[51] Int. Cl.² ............................................ H05B 5/06
[52] U.S. Cl. .......................... 219/10.61 R; 219/10.79; 219/10.41
[58] Field of Search ............... 219/10.61, 10.79, 10.43, 219/10.41

[56] References Cited

U.S. PATENT DOCUMENTS

| | | | |
|---|---|---|---|
| 2,448,010 | 8/1948 | Baker et al. | 219/10.61 |
| 2,785,263 | 3/1957 | Van Iperen | 219/10.79 |
| 2,902,572 | 9/1959 | Lackner et al. | 219/10.61 |
| 3,313,907 | 4/1967 | Geisel et al. | 219/10.61 |
| 3,444,346 | 5/1969 | Russell et al. | 219/10.61 |
| 4,054,770 | 10/1977 | Jackson et al. | 219/10.61 |

Primary Examiner—Elliot A. Goldberg
Assistant Examiner—Philip H. Leung
Attorney, Agent, or Firm—Birch, Stewart, Kolasch and Birch

[57] ABSTRACT

An induction heating apparatus for induction heating a strip metallic sheet material having a given width from one end to the other end of the material in the longitudinal direction while the material is transferred in the longitudinal direction, comprising a high frequency source, a high frequency coil coupled to the high frequency source and including at least one turn winding formed of two coil portions extending along the surface of the material in the lateral direction of the material to exceed the side edges of the material, a first magnetic flux concentrating member provided in the vicinity of one coil portion extending along the one coil portion to exceed the side edges of the material, and a second magnetic flux concentrating member provided in the vicinity of the other coil portion provided locally in the vicinity of the side edges of the material, whereby heating distribution is adapted to be made uniform throughout the width of the material.

12 Claims, 17 Drawing Figures

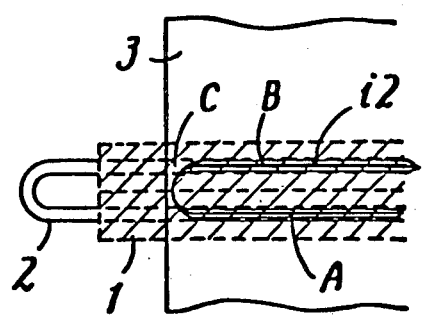
FIG. 3A
PRIOR ART
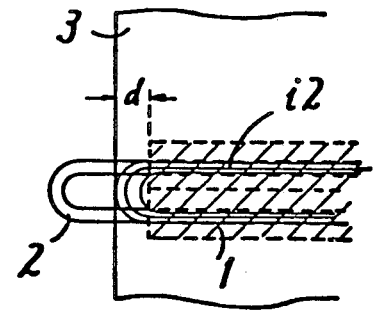
FIG. 3B
PRIOR ART
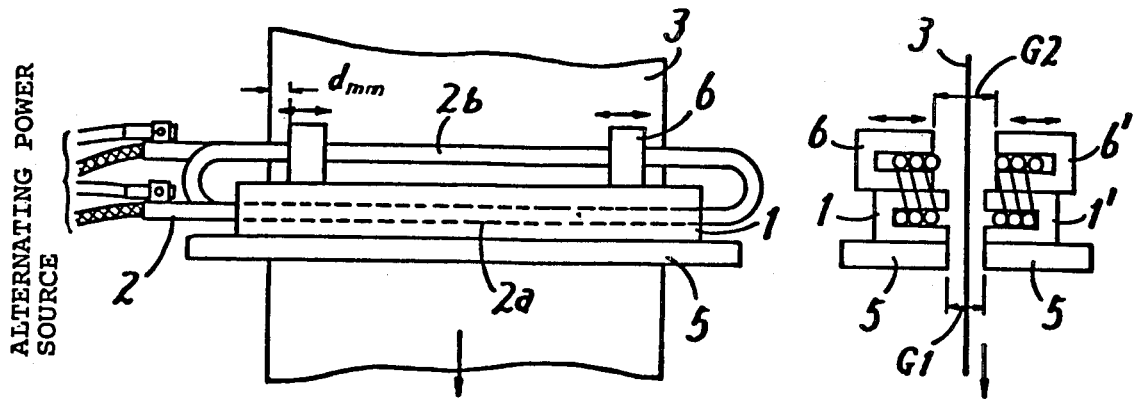
FIG. 4A
FIG. 4B
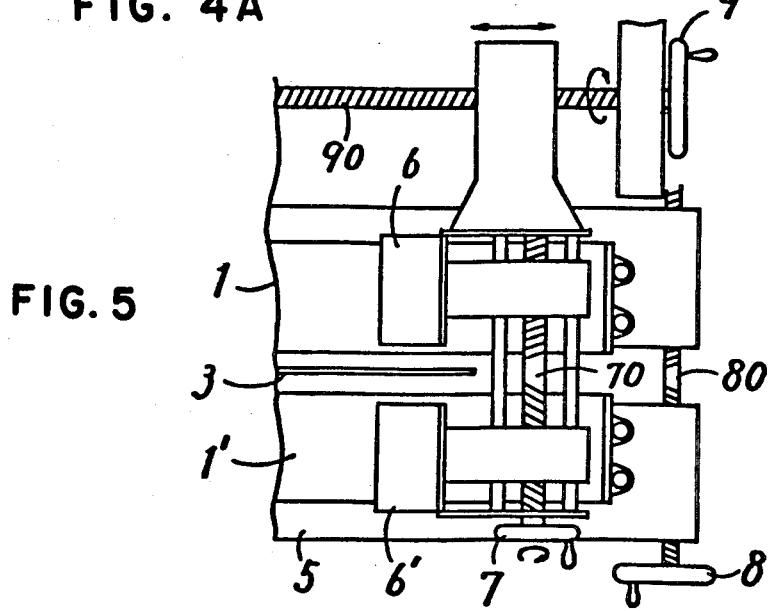
FIG. 5

INDUCTION HEATING APPARATUS WITH ADJUSTABLE FLUX CONCENTRATORS

BACKGROUND OF THE INVENTION

1. Field of the Invention

The present invention relates to an induction heating apparatus, and more particularly to an induction heating apparatus suited for a continuous induction heating apparatus of metallic materials in a sheet or foil form.

2. Description of the Prior Art

As is well known, an induction heating apparatus comprises an inductor or a heating coil provided adjacent to a conductive material. An alternating magnetic field is induced in the heating coil, such that an eddy current I is caused to flow through the conductive material by virtue of an electromagnetic induction effect. The conductive material then gives rise to the so called Joule heat $I^2R$ due to the inherent electrical resistance R of the said conductive material.

Hitherto an induction heating apparatus has been utilized in, for example, annealing a strip metallic sheet material. Application of an induction heating system to the heating of such a strip metallic sheet material may be classified as a longitudinal flux heating method as shown in FIG. 1(A) and a transverse flux heating method as shown in FIG. 1(B). However, the longitudinal flux heating method can not be applied to a non-magnetic material such as aluminum or the like, although the same can be applied to a magnetic material. In order to solve such a shortcoming, a transverse flux heating method as shown in FIG. 1(B) was developed, which was invented see U.S. Pat. No. 2,448,010, Baker, et al., Aug. 31, 1948, entitled Transverse Flux Induction Heating Furnace Structure. The principle of the method is well known without a further explanation.

FIG. 2(A) shows a sectional view of an apparatus for induction heating a strip metallic sheet material 3 such as aluminum in accordance with a transverse flux heating method and also shows the directions of a secondary current i2 generated in the strip metallic sheet material. The strip metallic sheet material 3 is transferred in the direction of the arrow a between opposing cores 1 and 1' of the magnetic material "E" letter shaped in section. The magnetic flux $\phi$ is generated in the arrow direction as shown, whereby a magnetic circuit is formed. The secondary current i2 or an eddy current as shown in FIG. 2(B) is generated in the strip metallic sheet material 3 as a function of the magnetic flux $\phi$ generated as shown in FIG. 2(A). The strip metallic sheet material 3 is heated by virtue of the secondary current i2. The strip metallic sheet material 3 is heated, while the material 3 is transferred in the direction of the arrow a. Accordingly, the strip metallic sheet material 3 is rather uniformly heated in the longitudinal direction throughout its major portion by virtue of the secondary current flowing in the width direction, although the edge portions 3a of the strip metallic sheet material 3 are additionally heated by virtue of the secondary current flowing in the longitudinal direction. As a result, the edge portions 3a are excessively heated, and uniform heating throughout the width direction becomes difficult. This will be described in more detail with reference to FIG. 3(A). FIG. 3(A) shows the portion 4 in FIG. 2(B) in an enlarged manner, wherein a hatched portion shows a portion which is influenced correspondingly by the core and to that end the same is identified by the same reference character 1 for simplicity. FIG. 3(A) shows a density distribution of the secondary current i2. The flow path of the secondary current i2 is determined by the core 1 and the current i2 flows from the portion A to the portion B. In such a case the density of the secondary current per a unit time is higher at the edge portion C, since the current flow component in the longitudinal direction is inevitably generated, with the result that the portion C is overheated. This is also caused by the fact that the heat transferrence at the edge is as small as a half of the central portion.

However, even in such a conventional method, an approximate uniform heating pattern could be obtained, if the cores 1 are disposed such that the end of the core is positioned slightly inside of the edges of strip metallic sheet material 3 as shown in FIG. 3(B). Nevertheless, in this case, a requirement must be met that the distance d as shown in FIG. 3(B) should be constant. Accordingly, a tiresome problem is encountered that each time the width of the strip metallic sheet material 3 is changed the core suited therefor must be replaced.

Thus, according to induction heating of the strip metallic sheet material by a transverse magnetic flux heating method, two major shortcomings were involved, namely, that uniform heating throughout the width direction of the strip metallic sheet material is difficult and that uniform heating of various strip metallic sheet materials having a variety of width and thickness by the use of the same induction heating coil is difficult.

SUMMARY OF THE INVENTION

Therefore, a principal object of the present invention is to provide an induction heating apparatus capable of uniformly heating a strip metallic sheet material of different width and thickness, by eliminating the above described difficulties.

The other objects and features of the present invention will become more apparent from the following detailed description made in conjunction with the accompanying drawings.

Briefly described, the present invention comprises an induction heating apparatus for high frequency induction heating of a strip metallic material during relative displacement thereof in the longitudinal direction, which comprises a coil including at least one winding formed of two coil portions extending in the lateral direction of said strip metallic material, a first magnetic flux concentrating member provided close to and along one coil portion out of said two coil portions, and a second magnetic flux concentrating member provided at the end portion of the other coil portion out of said two coil portions.

BRIEF DESCRIPTION OF THE DRAWINGS

FIGS. 3(A) and 3(B) are schematics which show, respectively, views for explaining the secondary current distribution in the strip metallic sheet material in accordance with the conventional method shown in FIGS. 2(A) and 2(B);

FIGS. 4(A) and 4(B) show, respectively a plan and sectional views of one embodiment of the inventive induction heating apparatus;

FIG. 5 shows in detail the major portion of the front view of the induction heating apparatus shown in FIGS. 4(A) and 4(B)

DESCRIPTION OF THE PREFERRED EMBODIMENTS

Figure 1A:
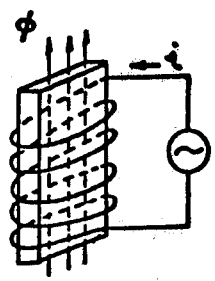
FIGS. 1(A) and 1(B) are schematics which show, respectively, the principles of two conventional induction heating methods.
Figure 1B:
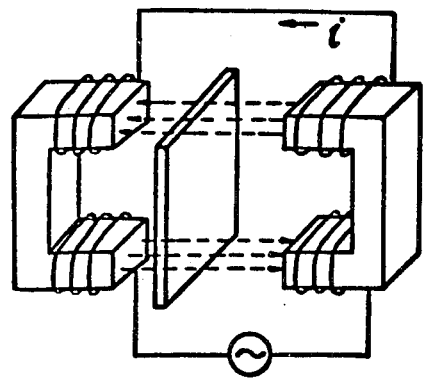
Figure 2A:
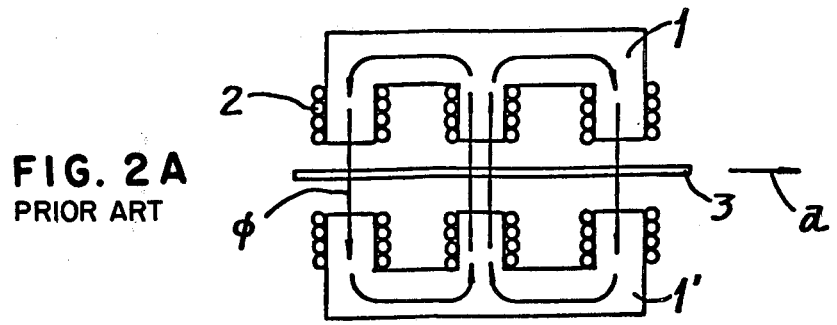
FIGS. 2(A) and 2(B) are schematics which show, respectively, a sectional view of a strip metallic sheet material being induction heated by the transverse magnetic flux heating method and the secondary current generated in the strip metallic sheet material.
Figure 2B:
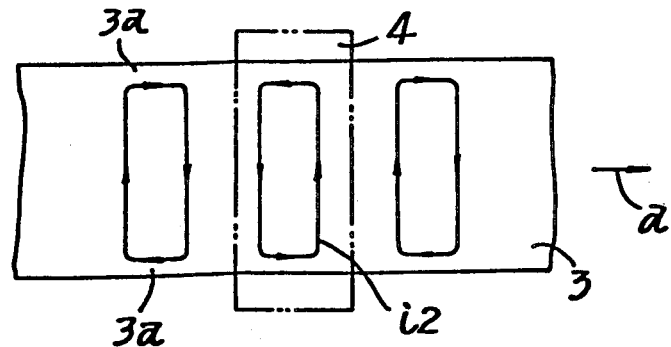

FIG. 4(A) shows a plan view of one embodiment of the inventive induction heating apparatus and FIG. 4(B) shows a sectional view of the apparatus. FIG. 5 shows in more detail a major portion of the elevational view of the induction heating apparatus shown in FIG. 4. An aspect of the embodiment shown is formation of two coil portions $2a$ and $2b$ extending in the tranverse direction or the width direction of the strip metallic sheet material 3 at each of the front and rear surfaces thereof and provision of long main cores 1 and 1' U-shaped in section, close to and surrounding one of the coil portions $2a$ and short auxiliary cores 6 and 6'; U-shaped in section, at both ends of the other coil portions $2b$ provided so as to be floated with respect to the sheet material 3. Each of the coils 2 comprises a multiple number of windings of a copper pipe. The coils 2 are connected to an alternating power source to cause high frequency induction. The said U-shaped sectional cores 1 and 1' are supported by a frame 5. A noteworthy aspect of the embodiment shown is that the length of the cores 1 and 1' have been selected to be larger than the width of the strip metallic sheet material.

Referring to FIG. 5, a relation of the cores 1 and 1' and 6 and 6' will be described in more detail. The cores 1 and 1' are provided symmetrically with the strip metallic sheet material 3 interposed therebetween. Both cores 1 and 1' are coupled to guide screw shafts 80 at both ends thereof. The guide shafts 80 have been threaded, so that the shaft 80 may be rotated by an adjusting handle 8 for adjustment of the main core gap G1 (see FIG. 4(B)), whereby the distance between the cores 1 and 1' may be adjusted. Similarly, auxiliary cores 6 and 6' are also coupled to guide shafts 70 at both ends thereof, so that the distance between the cores 6 and 6' may be adjusted by an adjusting handle 7 for adjustment of the auxiliary core gap G2 (see FIG. 4(B)). Furthermore, these cores 6 and 6' are adapted to be movable freely in the longitudinal direction of the main cores 1 and 1', i.e. the width direction of the strip metallic sheet material 3, by means of a guide shaft 90 and an adjusting handle 9.

Now an advantage to be achieved by means of the auxiliary cores 6 and 6' will be described in detail. Assuming that the strip metallic sheet material is heated without using the auxiliary cores, uniform heating can be effected throughout the width direction of the strip sheet material, only provided that the gap G1 between the main cores, the thickness t of the strip metallic sheet material and the frequency f of the alternating power source are properly determined. However, if the thickness t of the strip sheet material is different, uniform heating by the use of the same heating coil becomes difficult. Particularly, in case of a thin strip sheet material of less than 100μ in thickness, both edges of the sheet material are liable to be less heated. The auxiliary cores 6 and 6' serves to supplementally heat both edge portions which are liable to be less heated.

Figure 6:
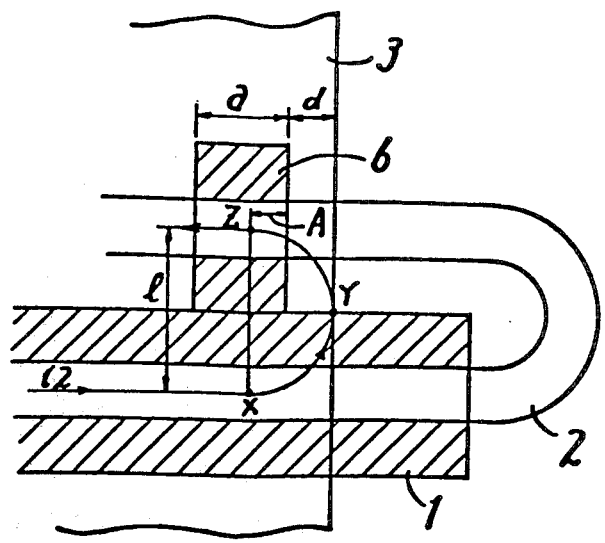
FIGS. 6, 7 and 8 are schematics which show respective views for explaining the secondary current distribution; in the embodiment of FIGS. 4(A), 4(B) and 5.

This will be described in more detail with reference to FIG. 6. FIG. 6 shows a relation of the path of the secondary current i2 flowing through the strip metallic sheet material 3 with the cores 1 and 6 and the copper pipe 2 that contribute to generation of the secondary current i2. Referring to FIG. 6, in order to uniformly heat the material throughout the width direction, the path of the secondary current i2 at the edge portion must be a semicircular form XYZ. In the figure, l denotes the distance between the grooves of the cores 1 and 6, i.e. the distance between the parallel copper pipes 2, and a denotes the length of the auxiliary cores 6. Accordingly, the distance d shown in FIG. 6 may be expressed as follows.

$$d = \tfrac{1}{2}l - A$$

The range of A must satisfy the following equation.

$$0 < A \leq \tfrac{1}{2}a \qquad (2)$$

Figure 7:
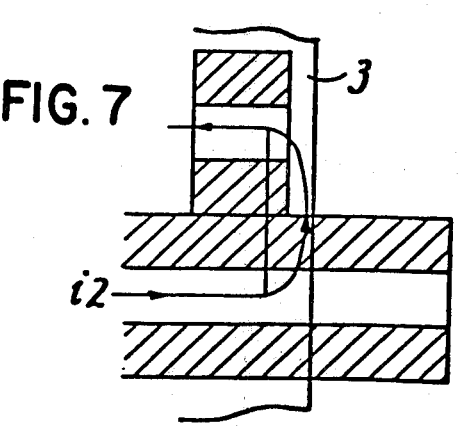
Figure 8:
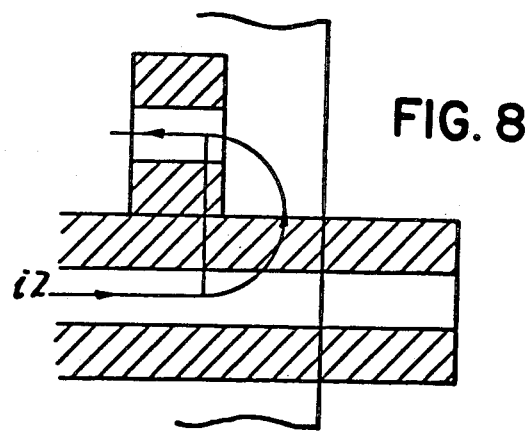

The range of A is determined by the gap G2 of the auxiliary cores and A≃0, if G2≃0. When G2 becomes the maximum gap $G2_{max}$ effective for the auxiliary cores i.e. when $G2 = G2_{max}$, then $A = \tfrac{1}{2}a$. If and when the auxiliary cores do not meet the relationships of the above described equations (1) and (2), uniform heating becomes difficult. Assuming that $d < \tfrac{1}{2}l - A$, the secondary current i2 does not flow at the edge portions in the circle shape but rather in an elliptical shape, as shown in FIG. 7. As a result, a current tends to flow in parallel with the travel direction of the strip metallic sheet material 3, whereby overheat is caused at the portions where the said current flows in parallel with the travel direction, with the result that uniform heating can not be attained. Assuming that $d > \tfrac{1}{2} - A$, the secondary current i2 flows at the edge portions as shown in FIG. 8, whereby the current density at the edge portions becomes low, with the result that those portions are likely to be less heated and uniform heating cannot be attained.

Figure 9:
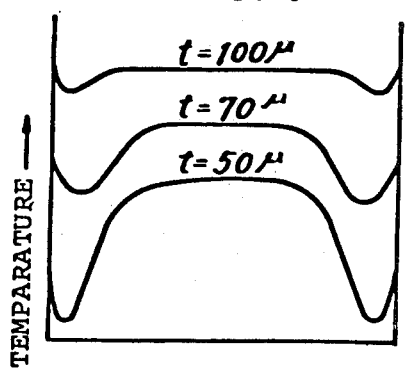
FIGS. 9 and 10 show experimental results in case where the auxiliary cores are not utilized.
Figure 10:
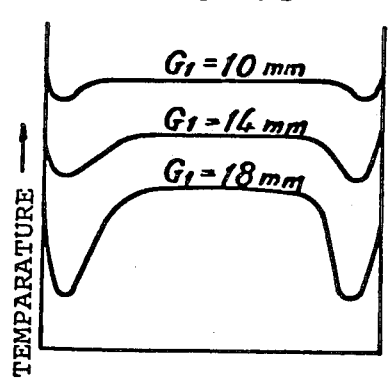

In case no auxiliary cores are provided, the extent of how the edge portions are less heated is different depending on the thickness t of the strip metallic sheet material and the gap G1 of the main cores. The experimental result in this connection is shown in FIGS. 9 and 10. Accordingly, the gap G2 of the auxiliary cores is determined and accordingly the above described thickness d is also determined in accordance with the above described extent of how the portions are less heated. In the following, several specific preferred examples are shown.

EXAMPLE 1

A heating apparatus of the structure as shown in FIG. 4 is utilized to heat continuously an aluminum foil of 100μ×500 mm width at the speed of 30 m/minute. Under the conditions that the frequency f is 1.0 kHz, the main core gap G1 is 10 mm, the auxiliary core gap G2 is 20 mm, the distance t of the auxiliary cores is 20 mm, uniform heating could be attained throughout the width direction. When the auxiliary cores were removed while the other conditions remained unchanged, i.e.

Figure 11:
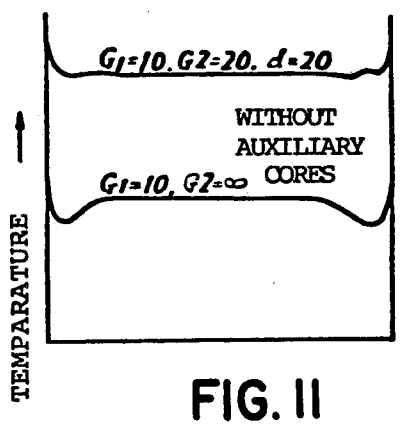
FIGS. 11 through 13 show the experimental results of the preferred embodiments of the present invention.

$G2=\infty$, the edge portions were less heated. The result of the same is shown in FIG. 11.

EXAMPLE 2

Figure 12:
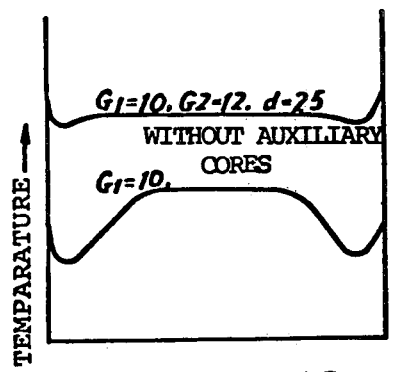

A heating coil of the structure as shown in FIG. 4 is utilized to continuously heat an aluminum foil of 60µ×500 mm in width at the speed of 30 m per minute. Under the conditions that f=1.0 kHz, G1=10 mm, G2=12 mm, and d=25 mm, uniform heating could be attained throughout the width direction of the foil. When the auxiliary cores were removed while the other conditions remained the same, the edge portions were less heated. The experimental result thereof is shown in FIG. 12.

EXAMPLE 3

Figure 13:
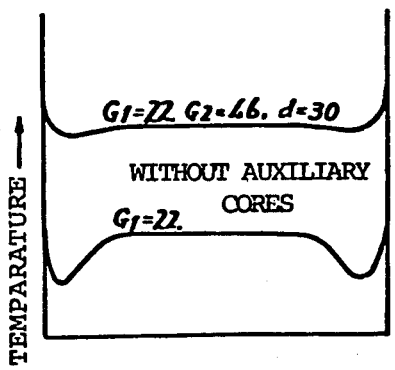

A heating coil of the structure as shown in FIG. 4 was employed to continuously heat an aluminum foil of 200µ×500 mm in width at the speed of 30 m per minute. Under the conditions that f=1.0 kHz, G1=22 mm, G2=46 mm, and d=30 mm, uniform heating could be attained throughout the width direction of the foil. When the auxiliary cores were removed while the other conditions remained the same, the edge portions were less heated. The experimental results are shown in FIG. 13.

EXAMPLE 4

An aluminum foil of 100µ×400 mm in width was continuously heated under the same conditions as those of Example 1. As a result, uniform heating could be attained throughout the width direction just like in the case of Example 1. Although in this case the width of the aluminum foil was as small as 400 mm, uniform heating could be attained throughout the width direction using the same heating coil by simply moving the positions of the auxiliary cores so as to be d=20 mm.

As apparent from the examples described in the foregoing, it is understood that according to the present invention only selection of the position d of the auxiliary cores is needed for the materials of different width and only selection of the above described position d and the gap G2 of the auxiliary cores is needed for the materials of different thickness.

As described in the foregoing, according to the embodiment of the present invention, since the path of the secondary current i2 at the edge portions of the strip sheet material induced in the strip metallic sheet material can be controlled by adjusting the position and gap of the auxiliary cores, uniform heating can be attained using the same heating coil throughout the width direction of the strip metallic sheet material of different thickness and width. Furthermore, since adjustment of the position and gap of the auxiliary cores can be simply attained by operation of the respective handles, adjustment of the heating core for uniformly heating the strip metallic sheet materials of different thickness and width becomes extremely simple, i.e. only selection of the position d of the auxiliary cores is needed for the materials of different width and only selection of the above described position d and the gap G2 of the auxiliary cores is needed for the material of different thickness.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. An induction heating apparatus for induction heating a continuous metallic sheet material having a given width through relative displacement in the longitudinal direction of said induction heating apparatus and said continuous metallic sheet material, said apparatus comprising:

high frequency supply means;

high frequency induction coil means coupled to said high frequency supply means and including a turn of winding formed of two coil portions each extending along the same surface of said continuous metallic sheet material in the lateral direction of said continuous metallic sheet material to exceed the side edges of said continuous metallic sheet material for supply of high frequency magnetic flux to said continuous metallic sheet material;

first magnetic flux concentrating means provided in the vicinity of one coil portion of said two coil portions for concentratively guiding the magnetic flux of said one coil portion to said continuous metallic sheet material, said first magnetic flux concentrating means extending along said one coil portion to exceed the side edges of said continuous metallic sheet material; and second magnetic flux concentrating means provided in the vicinity of the other coil portion of said two coil portions for concentratively guiding the magnetic flux of said other coil portion to said continuous metallic sheet material, said second magnetic flux concentrating means being provided locally in the vicinity of the side edges of said continuous metallic sheet material, whereby distribution of heating is made uniform throughout the width of said continuous metallic sheet material; said second magnetic flux concentrating means being positioned such that the distance d from the edge portion thereof to the edge portion of said continuous metallic sheet material satisfies the following equation;

$$d = \tfrac{1}{2}l - A \quad (0 < A \leq \tfrac{1}{2}a)$$

where l is the distance between the centers of said first and second magnetic flux concentrating means and a is the width of said second magnetic flux concentrating means.

2. An induction heating apparatus in accordance with claim 1, wherein said magnetic flux concentrating means is made of a magnetic material and is of a shape in section that surrounds said coil portion such that open end surfaces of said magnetic flux concentrating material face said continuous metallic sheet material to form a gap therewith.

3. An induction heating apparatus in accordance with claim 1, which further comprises means coupled to said second magnetic flux concentrating means for selectively positioning said second magnetic flux concentrating means in the lateral direction of said continuous metallic sheet material with respect to the side edges of said continuous metallic sheet material.

4. An induction heating apparatus in accordance with claim 3, wherein said positioning means comprises:

means for slidably supporting said second magnetic flux concentrating means in the lateral direction of said continuous metallic sheet material; and means for selectively positioning said second magnetic flux concentrating means in the said supporting means.

5. An induction heating apparatus in accordance with claim 1, which further comprises means coupled to said second magnetic flux concentrating means for selectively positioning said second magnetic flux concentrating means in the direction toward and away from the surface of said continuous metallic sheet material.

6. An induction heating apparatus in accordance with claim 5, wherein said positioning means comprises:
    means for slidably supporting said second magnetic flux concentrating means in the direction toward and away from the surface of said continuous metallic sheet material; and
    means for selectively sliding said second magnetic flux concentrating means in the said supporting means.

7. An induction heating apparatus in accordance with claim 1, which further comprises means coupled to said first magnetic flux concentrating means for selectably positioning said first magnetic flux concentrating means in the direction toward and away from said surface of said continuous metallic sheet material.

8. An induction heating apparatus in accordance with claim 7, wherein said positioning means comprises:
    means for slidably supporting said first magnetic flux concentrating means in the direction toward and away from said continuous metallic sheet material; and
    means for selectively sliding said first magnetic flux concentrating means in the said supporting means.

9. An induction heating apparatus in accordance with claim 1, which comprises at least two high frequency induction coil means provided in opposition adjacent the front and rear surfaces, respectively, of said continuous metallic sheet material;
    said first magnetic flux concentrating means in each said high frequency induction coil means being paired in opposed positions adjacent said front and rear surfaces; and
    said second magnetic flux concentrating means in each said high frequency induction coil means being paired in opposed positions adjacent said front and rear surfaces.

10. An induction heating apparatus in accordance with claim 1, which further comprises first positioning means coupled to said first and second magnetic flux concentrating means for selectively positioning them in the direction toward and away from said surface and second positioning means coupled to said second magnetic flux concentrating means for selectively positioning said second magnetic flux concentrating means laterally of said surface.

11. The induction heating apparatus in accordance with claim 9, which further comprises first positioning means coupled to said first and second magnetic flux concentrating means for selectively positioning them in the direction toward and away from said surfaces and second positioning means coupled to said second magnetic flux concentrating means for selectively positioning said second magnetic flux concentrating means laterally of said surfaces.

12. The induction heating apparatus in accordance with claim 10, wherein:
    said first positioning means comprises first supporting means for slidably supporting said first and second magnetic flux concentrating means in the direction toward and away from said continuous metallic sheet and means for selectively sliding said first and second magnetic flux concentrating means in said first supporting means; and
    said second positioning means comprises second supporting means for slidably supporting said second magnetic flux concentrating means in the lateral direction of said continuous metallic sheet material and means for selectively positioning said second magnetic flux concentrating means in said second supporting means.

* * * * *